(No Model.)
C. HAEFNER.
FILTER.
No. 575,478. Patented Jan. 19, 1897.
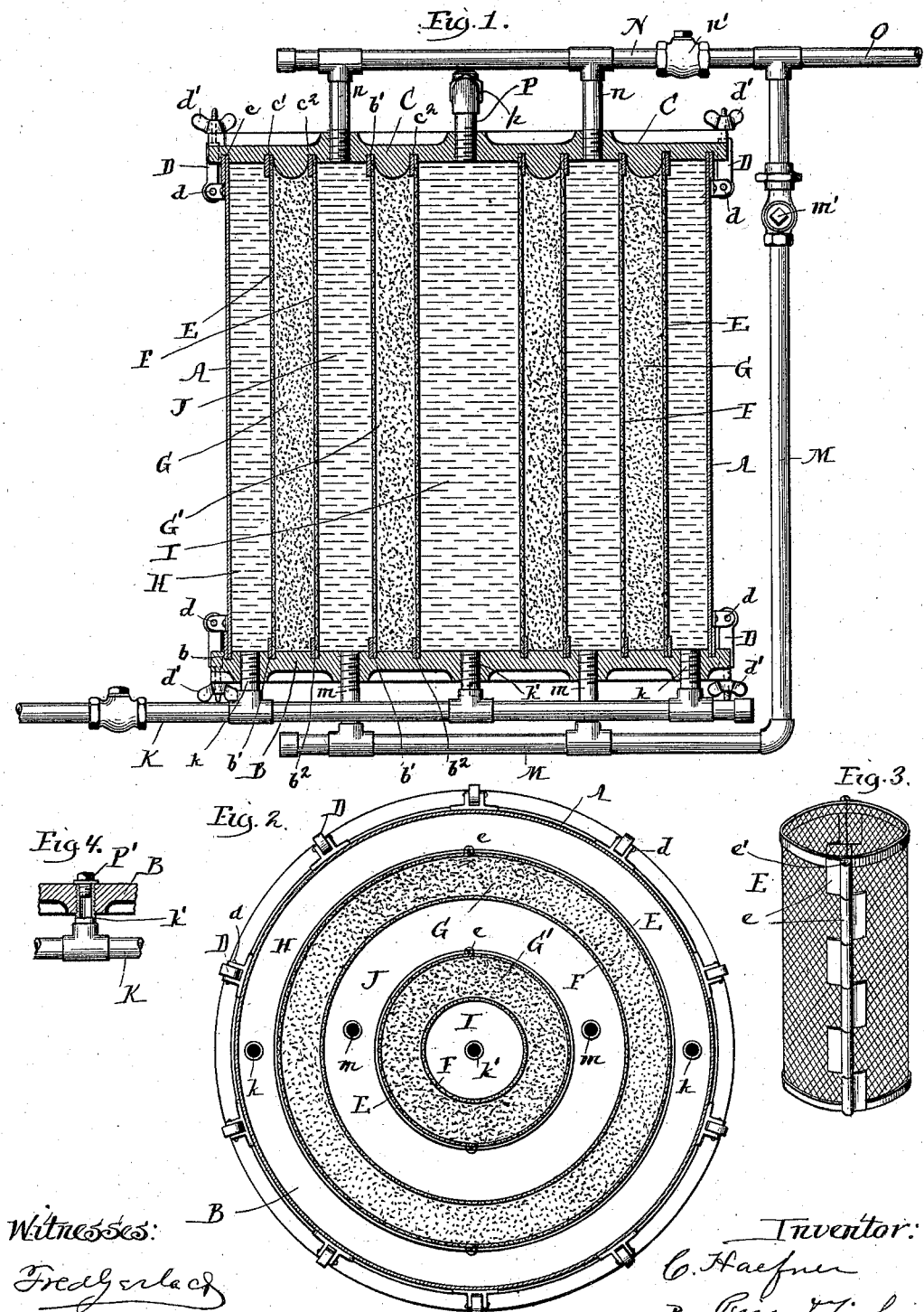
Witnesses:
Fred Gerlach
Alberta Adamick
Inventor:
C. Haefner
By Penn & Fisher
Attorneys.

UNITED STATES PATENT OFFICE.

CARL HAEFNER, OF CHICAGO, ILLINOIS, ASSIGNOR TO THE NATIONAL FILTER AND CARBONATING COMPANY, OF SAME PLACE.

FILTER.

SPECIFICATION forming part of Letters Patent No. 575,478, dated January 19, 1897.

Application filed June 17, 1895. Serial No. 553,066. (No model.)

*To all whom it may concern:*

Be it known that I, CARL HAEFNER, a citizen of the United States, residing at Chicago, in the county of Cook and State of Illinois, have invented certain new and useful Improvements in Beer-Filters, of which I do declare the following to be a full, clear, and exact description, reference being had to the accompanying drawings, forming a part of this specification.

The present invention has for its object, first, to provide an improved construction of filter for beer or like liquids in which the withdrawal of the beer may be effected from either the top or bottom of the filter; second, to provide an improved construction of filter by means of which the beer or like liquid can be caused to pass either through single filter masses or through double filter masses. These objects of invention I have accomplished by the novel features of construction hereinafter described, illustrated in the accompanying drawings, and particularly pointed out in the claims at the end of this specification.

Figure 1 is a view in central vertical section through a filter embodying my invention. Fig. 2 is a view in horizontal section through the body of the filter. Fig. 3 is a detail perspective view of the outer wall of the support for the filter mass. Fig. 4 is a detail view in vertical section through the central delivery-pipe, showing the plug therein.

A designates a vertical drum or casing that constitutes the body of the filter. Preferably this drum or casing is of cylindrical shape, although not essentially so.

B designates the bottom, and C the top, of the filter, the top and bottom being united to the body A preferably by means of the clamps D, that are pivoted, as at $d$, to lugs attached to the outside of the casing A, the free ends of these pivoted clamps D being fitted with adjusting-nuts $d'$ in manner well understood. The outer edges of the top and bottom C will be provided with a series of slots to receive the clamps D when they are turned outward in the position shown in Fig. 1, and when in such position by tightening the adjusting-nuts $d'$ the top and bottom can be firmly held upon the casing. Preferably the top and bottom B and C are provided upon their inner faces with a series of annular grooves, the outer grooves $c$ and $b$ serving to receive, respectively, the top and bottom edges of the casing A, while the series of inner annular grooves $b' b^2$ and $c' c^2$ serve to receive the top and bottom edges of the supports E and F, whereby the mass of filtering material G is sustained.

In the accompanying drawings I have shown two sets of supports E and F, serving to sustain the separate filter masses G and G', and the supports whereby these filter masses are sustained are separated such distance apart as to leave a chamber between them. The filter masses and their supports divide the filter into three chambers, to wit, the outer delivery-chamber H, the central chamber I, and the intermediate chamber J. To the chambers H and I at their bottoms connect branches $k$ and $k'$ of the main delivery-pipe K, and to the intermediate chamber J at its bottom connect the branches $m$ of the bottom outlet-pipe M. In like manner branches $n$ of the outlet-pipe N lead into the top of the intermediate chamber J. The outlet-pipes M and N are provided, respectively, with the cocks $m'$ and $n'$, whereby the passage of liquid through either of said pipes can be controlled, and preferably both the outlet-pipes M and N unite with a main outlet-pipe O, that leads to the racking apparatus. To the top of the central chamber I leads an outlet-pipe P, that is provided with a cock $p$, the purpose of which pipe will presently more fully appear.

From the foregoing description the operation of my improved filter will be seen to be as follows: If beer is admitted through the inlet-pipe K, it will pass by the branch pipes $k$ and $k'$ to the outer and central chambers H and I and thence through the filter masses G and G' to the intermediate chamber J, from which chamber the beer will be withdrawn by either the outlet branch M or N or both, according to the position of the cocks $m'$ and $n'$. By employing two vertical filter masses G and G', so as to form the outer and central delivery-chambers H and I for unfiltered beer and the intermediate chamber J for filtered beer, a very compact and effective arrangement of filter is obtained, since the same chamber J serves to receive the beer after it has been forced through both filter masses G and G'.

At the beginning of the filtering operation I prefer that the cock $m'$ of the outlet M should be closed and that the cock $n'$ of the outlet N should be open, since by this arrangement the air within the filter and as well also the turbid beer first passing through the filter mass may be withdrawn. As soon, however, as the filter is full of beer and clarified beer is seen to flow through the pipe O the cock $n'$ of the outlet N will be closed and the cock $m'$ of the outlet M will be opened, thereby allowing the subsequent discharge of the filtered beer during the remainder of the filtering operation to occur through the branch outlet M. It will thus be seen that by providing the outlet N at the top of the filter and the outlet M at the bottom I am enabled at the beginning of the operation to insure the filling of the filter with beer, and after such filling has been effected and the initial run of turbid or foamy beer has occurred the filtering operation can proceed without further attention, because, inasmuch as both the admission of the unfiltered beer and discharge of the filtered beer occur at the bottom of the filter, a discharge of filtered beer is insured notwithstanding the accumulation of gas in the upper part of the filter-chamber.

In the filtration of certain kinds of beer, and especially of beer intended to be bottled and exported, it is frequently desirable that a more perfect filtering action should be had than is ordinarily required where the beer is to be racked off into kegs. With my improved filter the unfiltered beer can be caused to pass through both filter masses G and G' by simply inserting a plug P' in the branch $k'$ at the bottom of the central chamber I, so as to cut off the admission of unfiltered beer to said chamber. Under such conditions the outlet branch N will have its cock $n'$ closed, and the cock $p$ of the pipe P at the top of the central chamber I will be open and will be connected with the bottling or racking apparatus. When thus used, it will be seen that the unfiltered beer admitted by the branch pipes $k$ to the bottom of the outer chamber H will pass through both filter masses G and G' to the central chamber I, from which it will be withdrawn by the pipe P, and, if desired, this pipe P may extend downward to approximately the bottom of the central chamber I. By this means a double filtration of the beer can be effected. So, also, it will be seen that if the supports of the filter mass G should become damaged the branch pipe $k'$ may have the threaded plug $p$ inserted therein, and the beer can then be withdrawn through the outlet-pipe P, the branch outlets M and N being at such time closed, or if the supports of the filter mass G' should become damaged this filter mass can be removed, the plug P' can be inserted in the branch pipe $k'$, and the beer can be withdrawn through either the branch outlets M or N.

Inasmuch as the filter masses G and G' are usually packed with considerable density between their supports E and F, I prefer to employ means, hereinafter described, whereby the filter mass may be quickly removed from the supports when a new mass is to be substituted, although such means forms no part of this invention. In order to accomplish this, I form the outer support E for each filter mass of vertically-divided sections, so that when the filter mass and its support is removed the sections of the outer support can be quickly opened in order to permit the filter mass to drop away from the inner support. The preferred manner of constructing the outer support E for the filter mass is that shown in Fig. 3 of the drawings, that is to say, the vertical sections of the support E are hinged together at one point, and at the opposite point the separable edges of this support are provided with eyes or clips $e$, through which a suitable rod $e'$ may be passed in order to temporarily hold the support E in closed position.

Having thus described the invention, what I claim as new, and desire to secure by Letters Patent, is—

1. A filter comprising a vertical drum or casing having top and bottom plates, two sets of vertical perforated supports within said drum and between which the filtering material is held, said supports and said filtering material serving to divide the filter into an outer chamber for unfiltered beer, a central chamber for unfiltered beer and an intermediate chamber for filtered beer, an inlet-pipe leading to the bottom of the chambers for unfiltered beer and a single outlet-pipe having branches leading from the filtered-beer chamber at both top and bottom of said chamber and suitable cocks for said branch outlet-pipes, substantially as described.

2. A filter comprising the combination with a drum or casing having top and bottom plates, of two sets of concentric removable cylinders for retaining the filter mass, said sets of cylinders being supported at a distance from each other to form a chamber for the filtered beer, the inner set of said cylinders forming a central chamber for unfiltered beer, and the outer set of said cylinders being located at a distance from the vertical walls of the drum or casing to form an outer chamber for the unfiltered beer, an inlet-pipe leading to the bottom of both of said unfiltered-beer chambers, suitable outlets for the filtered beer leading from both the top and bottom of the filtered-beer chamber, and an outlet leading from the central chamber for unfiltered beer whereby the beer may be admitted to the bottom of said unfiltered-beer chambers and may be withdrawn from both the top and bottom
5 of the filtered-beer chamber and whereby also if the unfiltered beer is admitted to the chamber adjacent the outer wall of the drum or casing the beer may be caused to pass through both filter masses and may be withdrawn from the central chamber.

CARL HAEFNER.

Witnesses:
GEORGE P. FISHER, Jr.,
ALBERTA ADAMICK.